United States Patent Office 2,963,368
Patented Dec. 6, 1960

2,963,368
METHOD OF PRODUCING A TEA CONCENTRATE

Frederick R. Greenbaum, Glenside, Pa., assignor to Kwik Kafe Coffee Processors of America, Inc., Hatboro, Pa., a corporation of Delaware No Drawing. Filed May 28, 1958, Ser. No. 738,311

2 Claims. (Cl. 99—77)

This invention relates to tea concentrates to be used in the brewing of hot and iced tea drinks, and is particularly concerned with a tea concentrate which is suitable for use in automatic dispensing machines and which is adapted to be stored and shipped in frozen condition. This invention is also concerned with methods for producing such concentrates.

It has been found that the caffeine and tannin in tea forms a complex which is poorly soluble in cold water. It is this complex which causes the clouding in iced tea when carelessly made by conventional methods. The problem is, of course, aggravated when it is attempted to prepare a concentrated extract of tea, whether in powder or liquid form. The problem is particularly acute in automatic dispensing equipment, in which the tea concentrate must be maintained at a low temperature in order to insure flavor and palatability in the reconstitued beverage.

Recent efforts to prevent the precipitation of the caffeine-tannin complex have involved the substantial elevation of pH and the addition of high concentrations of sugar to the tea concentrate. These expedients do not result in a product which is acceptable, as the fine aroma and flavor of tea is greatly deteriorated by the elevation of the pH.

A general object of the present invention is a tea concentrate which may be stored and shipped in frozen condition.

Another object of the invention is a tea concentrate which can be admixed with water in automatic vending machines to produce a palatable, flavorful, hot or cold tea beverage which is clear and sparkling.

A more specific object of the present invention is a tea concentrate from which a portion of the caffeine and tannin have been mechanically removed.

Another object of the invention is a tea concentrate in which a portion of the caffeine and tannin are retained in suspension through the use of suspending agents.

Yet another object of the invention is a tea extract in which a portion of the caffeine and tannin constituents are maintained in solution by means of solubilizing agents.

The invention has as still further objects, methods for producing tea extracts having the characteristics abovementioned.

Generally speaking, my invention contemplates the extraction of the flavor and color bodies of tea leaves by known means, followed by the mechanical removal of a portion of the caffeine and tannin constituents of the extract and the addition of solubilizing and/or suspending agents to prevent the precipitation of remaining caffeine and tannin constituents.

My invention also contemplates the addition of preservatives and agents for increasing the pH of the tea concentrate, and the freezing of the final concentrate products.

According to the invention, the flavor and color bodies of appropriately blended tea leaves are extracted by means of hot water flowing from the bottom to the top of an extractor charged with tea leaves, or of a series of such extractors, one after the other. I have found that the optimum water temperatures lie between 180° and 200° F. In the former case about 54% of the tannin and 86% of the caffeine is extracted, while in the latter, 71% of the tannin and 93% of the caffeine is extracted. The final extract has a specific gravity of about 1.040 to 1.050 at 77° F. and has a total solids content of 11% to 12%. The pH of the extract is about 4.80 to 5.00.

If such a concentrate is cooled, a cloudy precipitate, which I have found to comprise a tannin and caffeine complex, is formed and will not go into solution when the extract is added to an amount of cold water appropriate to make a cold tea beverage.

According to my invention, I reduce the concentration of caffeine and tannin in the extract so produced by passing it through a centrifuge, as a result of which the solids content is reduced to about 9% to 10%, and the specific gravity to between about 1.038 and 1.040.

Thereafter, I add a small proportion of a suspending agent, such as cellulose gum, Methocel, gum arabic, alginates or carraginates or 2 to 8% of other sea weed products and the like or a solubilizing agent, such as glycerol or Carbowax 200 or polypropyleneglycol, or mixtures thereof.

In addition to the foregoing steps, I may add to the tea concentrate sufficient alkali, for example in the form of sodium bicarbonate, to raise the pH of the concentrate to about 5.5, and about .1% of sodium benzoate as a preservative.

Finally, the concentrate is packed into cans and sealed and is frozen. Specific details of my method are disclosed in the examples just below.

*Example 1*

450 grams of blended Indian tea leaves were placed in a Pyrex tube, 2 feet long and 2 inches in diameter. The tea leaves were extracted with hot water at about 200° F., passing upwardly through the tube. A total yield of 1100 cc. of tea concentrate was obtained having about 12% total solids content, a pH of between 4.85 to 5.0, and a specific gravity of about 1.043 at 77° F.

The pH of the tea concentrate was raised to 5.50 by the addition of sodium bicarbonate, a total of about one gram being required to raise the sample of this example to that level. Thereafter, .1% sodium benzoate was added in small increments with vigorous agitation.

The concentrate was then centrifuged in a Sharpless centrifuge, being passed through at a rate of about 5 gallons per minute.

A sample of the centrifuged product was diluted 1:100 with water at 60° F. The optical density of the diluted concentrate was measured at a wave length of 450 m$\mu$ with a Beckman Model Du-Spectrophotometer. The optical density of the diluted sample was 0.350.

Cellulose gum type 70 was added in a concentration equal to four grams per gallon of concentrate, giving a concentration of .1%. The cellulose gum was prepared by mixing four grams of gum with 12 cc. of propyleneglycol and the paste so formed added to the tea concentrate with vigorous agitation.

The resulting product was frozen, stored for eight days and then thawed. When 7½ cc. of the concentrate were added to 150 cc. of hot water, a clear, palatable, hot tea drink resulted.

Result with cold water: The addition of 10 cc. of this tea concentrate added to about (6 oz.) 180 cc. of ice cold water resulted in a clear cold tea drink, which remained clear even when ice cubes were added and made a very fine ice tea drink.

Example II

In this example 0.1% alginates were used instead of the cellulose gum. The alginates were mixed with propyleneglycol in a ratio of 1:3 to form a paste which was added to the tea concentrate under vigorous agitation. The resulting product was similar to that of Example I.

Example III

In this example the cellulose gum of Example I was replaced by 5% of Carbowax 200 (polyethyleneglycol). This material is a solubilizing agent for the tannin-caffeine complex rather than a suspending agent as used in the foregoing example. As little as 2% of this polyethyleneglycol will produce a tea concentrate free from sediment. The product of this example was equal to that of Example I.

Examples IV, V, and VI

In these examples the cellulose gum was respectively replaced by polypropyleneglycols 1025, 425 and 150, in each case in concentrations of 2%–5%. The results were similar to those of Example I.

Example VII

In this example there were employed .1% of cellulose gum and 6% propyleneglycol as a solubilizing agent. The product of this example was judged to be superior to the products obtained by the utilization of either solubilizing agents or suspending agents alone, its superiority being demonstrated in increased resistance to sedimentation upon protracted frozen storage.

In addition to the suspending agents of Examples I and II, there may be used Methocel, gum arabic, and tragacanth. However, the polyhydric alcohols appear to possess a solubilizing action on the caffeine tannin colloidal particles which is superior to the suspending action of the agents used in Examples I and II.

The force of centrifuging used is 4500 to 7500 G (using a Sharpless centrifuge at 6000 r.p.m. with a 10½″ bowl) at a flow rate varying from 2 to 8 gallons per minute.

I have found the degree of centrifuging to be satisfactory when the force of centrifuging is between 4500 G and 7500 G and the flow rate of tea through the centrifuge is not less than one nor more than ten gallons per minute.

A check on the efficacy of the removal of the caffeine-tannin complex by the centrifuging operation may be made by measuring the light transmission of the concentrate after centrifuging. I have found that the light transmission at a wave length of 450 m$\mu$ gives a predictable measure of the tendency of the concentrate to produce a clear or cloudy drink.

Specifically, I have found that a 10% solids concentrate which has an optical density less than 0.350 when diluted 1:100 will produce a clear, full flavored iced tea drink when diluted about 1:20.

In the commercial practice of the invention, the concentrate is packed into sterile ⅙ gallon cans, filled, and sealed, whereupon the product in the cans is frozen in the cans and held at a temperature of about 5° F.

The finished concentrate contains about 1% caffeine and about 3% tannins. When it is added to water, the result is a tea beverage which, when brewed to a strength giving color and flavor equivalent to a conventionally brewed cup of tea, contains less caffeine and tannins than the conventionally brewed beverage. The lower concentration of tannins results in a somewhat less astringent tasting beverage; in other respects the reconstituted beverage is comparable in aroma and flavor to tea which has been properly brewed from fresh tea leaves.

Iced tea prepared from my extract can be stored under refrigeration and will not form the cloudy precipitate which is characteristic of freshly brewed tea when it is stored under like conditions.

In addition, my tea extract in concentrated form has the advantage that solids do not precipitate during refrigerated or even frozen storage, with the result that the reconstituted tea beverage is free from cloud and that the concentrate itself may be dispensed in automatic machinery without danger of precipitation in the valves and other portions of the dispensing mechanism.

I claim:

1. The method of producing a tea concentrate which comprises extracting the soluble elements of tea leaves with hot water to produce a tea extract having a suspended solid phase comprising in part a caffeine-tannin complex, and having a pH of about 4.8 to 5.0, adding sodium bicarbonate to raise the pH of the extract to about 5.5, adding about .1% of sodium benzoate, passing the extract through an ultra centrifuge to partly remove the said suspended caffeine-tannin complex, whereby to produce an extract having a materially lowered caffeine and tannin content, adding about .1% of a suspending agent selected from the class consisting of cellulose gum, Methocel, gum arabic, alginates, and carriginates, packing the concentrate in gas-tight containers, and freezing the concentrate therein.

2. The method of producing a tea concentrate which comprises extracting the soluble elements of tea leaves with water at a temperature between 180° F. and 200° F. to produce a tea extract having a specific gravity of about 1.040 to 1.050 at 77° F. and having a total solids content of about 11% to 12% and a pH of about 4.80 to 5.0, adding sodium bicarbonate to raise the pH of the extract to about 5.5, adding about .1% of sodium benzoate, passing the extract through an ultra centrifuge to remove suspended bodies whereby to produce an extract having a solids content of about 10% and having an optical density less than .350 at a wave length of 450 m$\mu$ when diluted 1 part to 100 at 60° F., adding about .1% of a suspending agent selected from the class consisting of cellulose gum, Methocel, gum arabic, alginates, and carriginates, to each gallon of tea concentrate, packing the concentrate in gas-tight containers and freezing the concentrate therein.

References Cited in the file of this patent

UNITED STATES PATENTS

| Number | Name | Date |
| --- | --- | --- |
| 1,094,675 | Moncrief | Apr. 28, 1914 |
| 1,520,122 | Gephart | Dec. 23, 1924 |
| 1,525,272 | Darrah | Feb. 3, 1925 |
| 1,916,468 | Epstein | July 4, 1933 |
| 2,235,700 | Eldred | Mar. 18, 1941 |
| 2,393,562 | Perech | Jan. 22, 1946 |
| 2,852,388 | Cortez | Sept. 16, 1958 |
| 2,891,866 | Schroeder | June 23, 1959 |

FOREIGN PATENTS

| Number | Country | Date |
| --- | --- | --- |
| 26,292 | Great Britain | of 1897 |